United States Patent [19]
Monk et al.

[11] Patent Number: 5,542,341
[45] Date of Patent: Aug. 6, 1996

[54] WRIST PIN CONSTRUCTION

[75] Inventors: David T. Monk; Pantelis Hatzikazakis, both of Bristol, Tenn.; Kevin N. Mumpower, Bristol, Va.

[73] Assignee: Bristol Compressors, Inc., Bristol, Va.

[21] Appl. No.: 295,372

[22] Filed: Aug. 24, 1994

[51] Int. Cl.⁶ ............................................. F16J 1/14
[52] U.S. Cl. .............................................. 92/187
[58] Field of Search .............................. 92/187, 188, 189, 92/190, 191; 74/579 E

[56] References Cited

U.S. PATENT DOCUMENTS

| | | | |
|---|---|---|---|
| 2,069,594 | 2/1937 | Schneider | 92/189 X |
| 2,823,085 | 2/1958 | Keylwert | 92/187 X |
| 2,860,614 | 11/1958 | Burnand | 92/187 X |
| 3,745,889 | 7/1973 | Hill et al. | 92/187 |
| 4,005,686 | 2/1977 | Wizemann et al. | 92/190 X |
| 4,013,057 | 3/1977 | Guenther | 92/187 X |
| 4,550,647 | 11/1985 | Coulin | 92/187 X |

FOREIGN PATENT DOCUMENTS

| | | | |
|---|---|---|---|
| 2615212 | 10/1977 | Germany | 92/187 |
| 291031 | 12/1931 | Italy | 92/191 |
| 1206383 | 9/1970 | United Kingdom | 92/187 |

*Primary Examiner*—John E. Ryznic

[57] ABSTRACT

A wrist pin for use with a piston of a refrigeration compressor unit, wherein the wrist pin is to be mounted on a piston and non-rotatively affixed thereto, the pin having a longitudinal axis, a round cross-section and a uniform diameter over substantially its entire length to provide a peripheral journal surface adapted to be mounted within and juxtaposed the bearing surface of a wrist pin bore of a connecting rod for rocking motion within the bore, one or more oil transport grooves in the journal surface circumscribing the same within a longitudinally central region thereof, a generally longitudinally extending recess in the journal surface extending across the one or more grooves and to either side thereof within the region, the region of the journal surface being dimensioned to lie totally within the wrist pin bore of the connecting rod, the recess laterally encompassing an arc angle of from about 6° to about 30°.

5 Claims, 3 Drawing Sheets

WRIST PIN CONSTRUCTION

This invention concerns wrist pin construction, particularly for use in refrigeration or air conditioning compressor units of the hermetically sealed type wherein the shell which contains the compressor and its drive motor is comprised of upper and lower cup shaped sections which, after the compressor and motor are mounted therein, are secured together, e.g., by welding along the peripheral mating joint formed by their contiguous open end portions.

In such compressors, lubrication of the area where the wrist pin is pivotally mounted within the wrist pin bore of the connecting rod is typically achieved by pumping the sump oil through an oil passage in the connecting rod, which passage opens through the high force or compression side of said bore. Variously shaped circumferential grooves, e.g., chevron types, are also typically provided in the outer surface of the wrist pin to allow the oil to more easily flow around the outer surface of the wrist pin and onto the surrounding surfaces of the wrist pin bore. Such construction is well elucidated in U.S. Pat. No. 5,118,263, particularly in column 5, lines 45–58, and the disclosure of this patent, especially in regard to wrist pin-rod bearing area lubrication, is hereby incorporated herein by reference.

DISCUSSION OF THE PRIOR ART

Several structural and configurational variations for wrist pins for refrigeration or internal combustion units have been proposed as evidenced by U.S. Pat. Nos.: 3,479,929; 2,990,226; 3,842,938; 5,009,124; 2,583,583; 5,046,930; 4,754,608; 4,461,595; 4,350,083; 4,013,057; 3,702,092; 2,849,265; 1,789,089; 1,754,753; 4,913,001; and 1,637,765, however, the present design and use restrictions for compressors as mandated by environmental considerations have engendered problems which have not been anticipated by and are not addressed by these prior wrist pin designs.

In this regard, the more environmentally safe, i.e., ozone non-destructive refrigerant materials now being mandated do not possess the same thermodynamic properties as the conventional fluoro-chloro hydrocarbons and markedly higher operating pressures are required to achieve the desired cooling capacities. These high operating pressures can easily destroy a conventionally constructed wrist pin and its upper rod bearing through heavier contact of the pin with the bearing on the compression stroke, wherein conventional lubricating mechanisms cannot accommodate the necessary impact cushioning and anti-friction requirements. This is especially the case where the wrist pin is locked in nonrotative position to the piston. In this regard, connecting rods require special lubrication in the wrist pin end due to the fact that there is not a rotating shaft, but rather a rocking shaft. The rocking shaft does not rotate enough to start the oil "wedge" necessary to form hydrodynamic lubrication. The new design wrist pin as described in detail below allows maximum rocking because of its fix pinned design, as well as a flat or recess ground or machined into its surface. The flat allows oil to enter nearly the full length of the connecting rod, therefore the rocking action of the rod will be able to squeeze an oil wedge from the flat into the loaded area of the connecting rod-wrist pin connection area. The flat serves as an area for wedge propagation to introduce hydro-dynamic lubrication, and to prevent boundary layer lubrication.

Objects, therefore, of the present invention are: to provide a mechanism for lubricating the connection area of the wrist pin and associated upper rod bearing of a refrigerant compressor, which mechanism provides markedly enhanced cushioning and lubrication to the connection area such as to suffice for the higher operating pressures resulting from use of the newer refrigerants; and to provide such mechanism with simple, easy to manufacture, easy to use, and inexpensive construction.

SUMMARY OF THE INVENTION

These and other objects hereinafter becoming apparent have been attained in accordance with the present invention which in its broad aspects is defined as a wrist pin for use with a piston of a refrigeration compressor unit, wherein the wrist pin is to be mounted on a piston and non-rotatively affixed thereto, said pin having a longitudinal axis, a round cross-section and a uniform diameter over substantially its entire length to provide a peripheral journal surface adapted to be mounted within and juxtaposed the bearing surface of a wrist pin bore of a connecting rod for rocking motion within said bore, oil transport groove means in said journal surface circumscribing the same within a longitudinally central region thereof, a generally longitudinally extending recess in said journal surface extending across said groove means and to either side thereof within said region, said region of said journal surface being dimensioned to lie totally within said wrist pin bore of said connecting rod, and said recess laterally encompassing an arc angle of from about 6° to about 30°.

In certain preferred embodiments:

(a) said recess is a flat cut out in the journal surface;
(b) said arc angle is from about 10° to about 25°; and
(c) said wrist pin is oriented within said connecting rod bore such that said recess is positioned substantially adjacent and communicating with the outlet of oil passage means formed substantially longitudinally through said connecting rod and the high pressure side of the upper bearing thereof.

BRIEF DESCRIPTION OF THE DRAWINGS

The invention will be further understood from the following drawings of certain preferred embodiments and the description thereof wherein the depictions are not necessarily to scale or in actual proportions.

Figure 1:
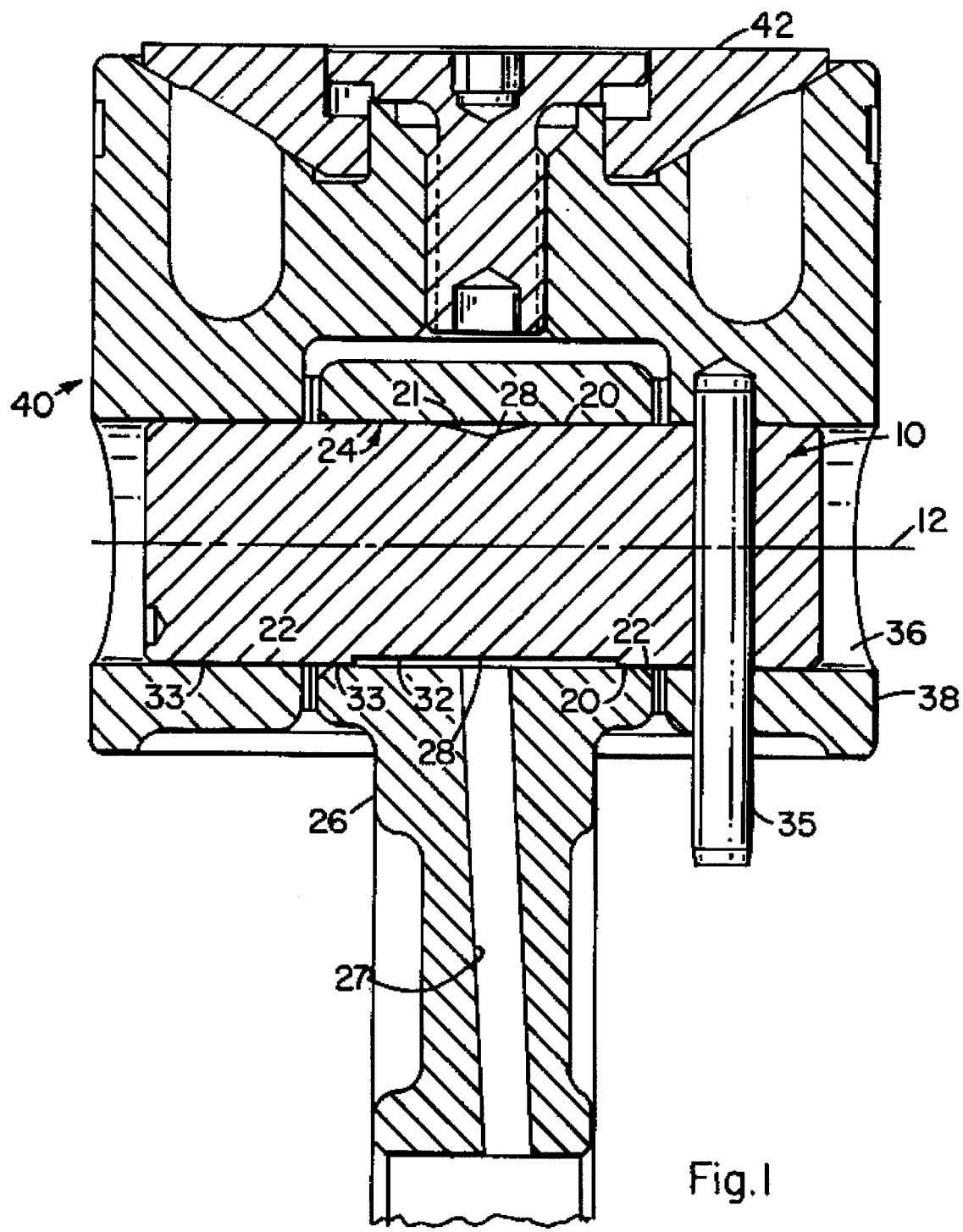
FIG. 1 is a cross-sectional view of a refrigerant compressor piston with a connecting rod pivotally attached thereto at its upper bearing by the present wrist pin.
Figure 2:
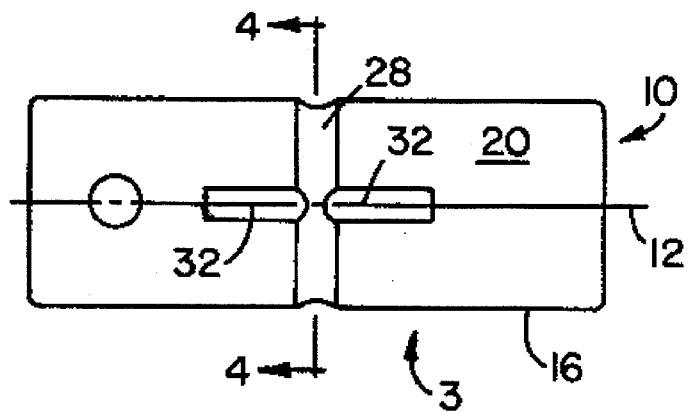
FIG. 2 is an elevational view of the high pressure or compression side of the present wrist pin.
Figure 3:
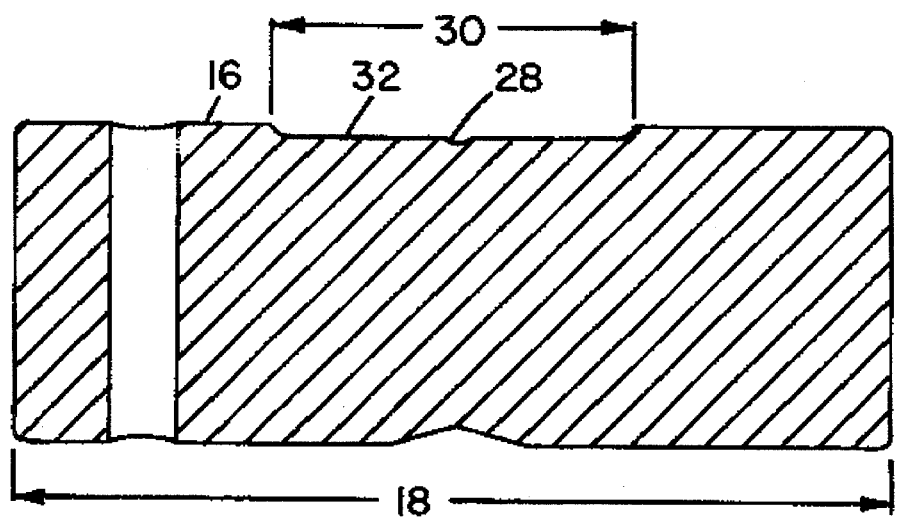
FIG. 3 is an elevational view of the wrist pin of FIG. 2 taken in the direction of line 3 in FIG. 2.
Figure 4:
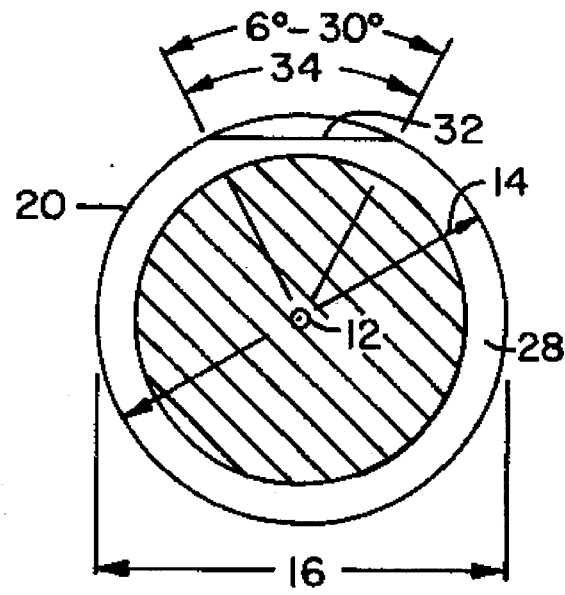
FIG. 4 is an enlarged cross-sectional view of the wrist pin taken along line 4—4 of FIG. 2 in the direction of the arrows.

Referring to the drawings and with reference to the claims herein, the present wrist pin 10 has a longitudinal axis 12, a round cross-section 14 and a uniform diameter 16 over substantially its entire length 18 to provide a peripheral journal surface 20 adapted to be mounted within and juxtaposed the bearing surface 22 of a wrist pin bore 24 of a connecting rod 26 for rocking motion within said bore, oil transport groove means 28 in said journal surface circumscribing the same within a longitudinally central region 30 thereof, a generally longitudinally extending recess or flat 32 in said journal surface 20 extending across said groove means 28 and to either side thereof within said region, said region 30 of said journal surface being dimensioned to lie totally within said wrist pin bore 24 of said connecting rod, said recess laterally encompassing an arc angle 34 of from about 6° to about 30°, preferably from about 10° to about 25°, and most preferably from about 13° to about 19°.

Figure 5:
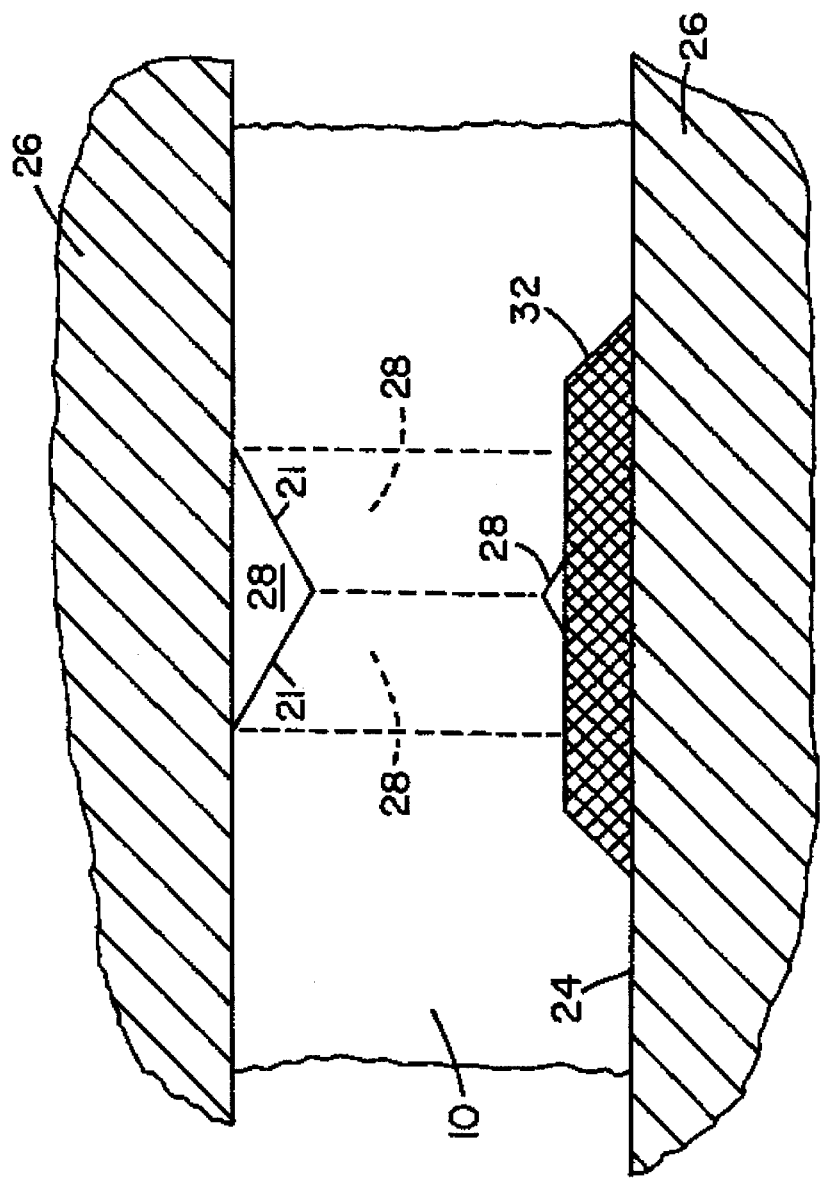
FIG. 5 is an enlarged view of the wrist pin in elevation and the adjacent bearing portions of the connecting rod shown in cross section and showing the groove means and recess volumes.
Figure 3A:
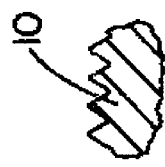
FIGS. 3a, 3b, and 3c are cross-sectional variations of configuration of the recess surface.
Figure 3B:
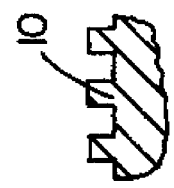
Figure 3C:
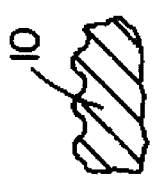

Pin 10 is preferably of hardened steel and the groove 28 and flat 32 are preferably ground into its surface which comprises the high force side 33 of the pin, but, of course may be machined therein. This pin is nonrotatably affixed within bore 36 formed in skirt 38 of the piston 40. Such exemplary compressor piston is shown in U.S. Pat. No. 5,326,231 wherein the suction valve is mounted in the piston top. The oil transport groove means 28 may also be multiple grooves and may be of any cross-sectional shape such as shown in FIGS. 3a, 3b, and 3c, or the like, preferably however, the ratio of the total volumetric capacity of the groove means 28, i.e., of the single groove as shown, or of all of any multiplicity of grooves which may be employed, to the total volumetric capacity of the recess 32 should fall within the range of from about 0.8 to about 2.5, and most preferably from about 1.0 to about 2.2 in order to achieve the desired oil pumping action derived from the rocking of the wrist pin within rod bore 24. These volumetric capacities are defined respectively by the space between the surface portions of the wrist pin which form groove means 28 and rod bore 24, and which from recess 32 and rod bore 24. These volumes are shown enlarged in FIG. 5. It is noted that recess 32 does not have to be uniformly configured and may comprise a plurality of segments and/or be formed with an irregular or undulating surface, as long as the recess is in communication with the oil feed passage 27 of the connecting rod.

The invention has been described in detail with particular reference to preferred embodiments thereof, but it will be understood that variations and modifications will be effected with the spirit and scope of the invention.

We claim:

1. A wrist pin for use with a piston of a refrigeration compressor unit, wherein the wrist pin is to be mounted on a piston and non-rotatively affixed thereto, said pin comprising an elongated structure having a longitudinal axis, a round cross-section and a uniform diameter over substantially its entire length to provide a peripheral journal surface adapted to be mounted within and juxtaposed with the bearing surface of a wrist pin bore of a connecting rod for rocking motion within said bore, oil transport groove means in said journal surface circumscribing the same within a longitudinally central region thereof, a generally longitudinally extending recess in said journal surface extending across said groove means and to either side thereof within said region, said region of said journal surface being dimensioned to lie totally within said wrist pin bore of said connecting rod, said recess laterally encompassing an arc angle of from about 6° to about 30°.

2. The wrist pin of claim 1 wherein said recess is a flat cut out in the journal surface.

3. In a refrigeration compressor unit the assembly comprising an interconnected piston, connecting rod and wrist pin, said piston having a top portion and a depending skirt portion providing a connecting rod access cavity, said pin being non-rotatively affixed to said piston and extending laterally through said skirt portion and access cavity, said connecting rod having a piston end provided with a wrist pin bore having a bearing surface, said wrist pin being mounted within said bore and having a longitudinal axis, a round cross-section and a uniform diameter over substantially its entire length to provide a peripheral journal surface and juxtaposed said bearing surface of said wrist pin bore for rocking motion within said bore, oil transport groove means in said journal surface circumscribing the same within a longitudinally central region thereof, a generally longitudinally extending recess in said journal surface extending across said groove means and to either side thereof, said recess lying within the region of said journal surface which lies totally within said wrist pin bore of said connecting rod, said recess laterally encompassing an arc of from about 6° to about 30°.

4. The compressor of claim 3 wherein said wrist pin is oriented within said bore such that said recess is positioned substantially adjacent and communicating with an outlet of an oil passage means formed substantially longitudinally through said connecting rod, and further communicating with a high pressure portion of an upper bearing surface of said connecting rod.

5. The compressor of claim 4 wherein the ratio of the total volumetric capacity of said groove means to the total volumetric capacity of said recess is from about 0.8 to about 2.5.

* * * * *